United States Patent [19]
Inoue et al.

[11] 3,982,580
[45] Sept. 28, 1976

[54] PNEUMATIC TIRE FOR CONSTRUCTION VEHICLES

[75] Inventors: Osamu Inoue; Masaru Abe, both of Sayama; Toshiro Tezuka, Higashi-Murayama, all of Japan

[73] Assignee: Bridgestone Tire Company Limited, Tokyo, Japan

[22] Filed: Oct. 18, 1974

[21] Appl. No.: 515,953

[30] Foreign Application Priority Data

Oct. 23, 1973 Japan............................ 48-118466
Oct. 23, 1973 Japan..................... 48-122310[U]

[52] U.S. Cl............................. 152/361 R; 152/354; 152/361 DM
[51] Int. Cl.²....................... B60C 9/18; B60C 9/04
[58] Field of Search............ 152/330 R, 352, 361 R, 152/361 DM, 374, 354, 357, 359; 139/425

[56] References Cited
UNITED STATES PATENTS

| | | | |
|---|---|---|---|
| 2,976,905 | 3/1961 | Beckadolph | 152/361 R |
| 3,087,699 | 4/1963 | Foster | 139/425 R X |
| 3,392,774 | 7/1968 | Busse | 152/361 R |
| 3,786,851 | 1/1974 | Mirtain et al. | 152/361 DM |
| 3,828,827 | 8/1974 | Witt et al. | 139/425 R X |

*Primary Examiner*—Drayton E. Hoffman
*Attorney, Agent, or Firm*—Sughrue, Rothwell, Mion, Zinn and Macpeak

[57] ABSTRACT

This invention relates to an improvement in a pneumatic tire for construction vehicles. The improved tire makes use of a steel cord breaker, but can prevent mechanical and thermal separations in the tire. Breaker rubberized cords are designed to have a gap ratio given by

$$\delta = \frac{D-d}{D} = 0.67 \text{ to } 0.83 ,$$

preferably 0.72 to 0.80, for the purpose of restraining the mechanical separation, where $D$ is a distance between centers of two adjacent cords and $d$ is a diameter of the cord. A tread rubber layer is designed to have a ratio $R$ of a skid base $S$ to a tire section height $H$ given by $$R = \frac{9}{H(\text{mm})} + (1.1 \times 10^{-2} \pm 3.0 \times 10^{-3})$$

for the purpose of restraining the thermal separation.

10 Claims, 9 Drawing Figures

FIG_1

FIG_3

PNEUMATIC TIRE FOR CONSTRUCTION VEHICLES

This invention relates to pneumatic tires and more particularly to a highly durable relatively large pneumatic tire for construction vehicles such as a dump truck, scraper and other heavy-duty construction vehicles for civil work and which are especially suited for travel on so-called off roads other than customary road and where on the surface thereof are scattered sharp rocks and stones which can cause separation failure of the tire due to tire cut and the like.

In such kind of special pneumatic tires, the most important tire property consists in a tire cut resistance, layer separation resistance in the crown of the tire, and wear resistance. The wear resistance might be improved by providing a suitable tread rubber compound. It is essential, therefore, to improve the tire cut resistance.

In order to improve the tire cut resistance, a number of tires each having shredded wire layers have been patented, for example, in U.S. Pat. Nos. 3,085,616, 3,095,026, 3,095,027, 3,097,915, 3,057,389, 3,050,098 and 3,043,357.

The tire having a shredded wire layer comprises at under tread portion, namely between a tread rubber and a carcass, a layer composed of a number of wire filaments each having a diameter of 0.1 to 0.3 mm and length of approximately 10 mm and embedded in rubber.

In practice, the tire having a shredded wire layer has the disadvantage that the tire is difficult to be manufactured, that the separation frequently occurs in the shredded wire layer or between the said layer and the adjacent layers, that life of the tire becomes short due to such separation failure before the merit of tire cut resistance plays its role, and that the durability of the tire could not be improved.

Steel breaker type tires comprising a breaker composed of steel cords have recently been observed useful as a tire for construction vehicles.

The representative type of this kind of tires is specialized in so-called radial construction carcass in which a carcass ply often consists of one steel cord layer. In general, the radial construction carcass tire has a feature that its side wall portion is highly flexible, and as a result, the side wall portion of the tire becomes considerably protruded in a transverse direction under a load condition. This protruded side wall portion is subjected to local tensile force and brought into contact with the sharp rock and stones. Thus, there is a risk of the side wall portion being cut. In order to prevent such side cut, it has been proposed to reinforce the side portions of the carcass ply. But the reinforcement of the carcass ply results in difficulty in manufacture of the tire and has not solved the side cut problem.

The tire comprising the carcass reinforced by the steel breaker inclusive of the above described radial carcass type tire and used for the construction vehicles has the disadvantage that the steel breaker is often separated between the steel cords and the breaker coating rubber.

This separation failure occurs due to the considerably large difference between the property of the steel cords and the property of rubber. It is difficult to make the strength of bond between the steel cords and the rubber stronger than that allowable in the mass production scale of the tire. In addition, the tire for construction vehicles is subjected to overloads under the severe service condition which exceeds the upper limit of the bonding strength or the breaking strength of the rubber located between the cords.

An object of the invention is to provide a highly durable pneumatic tire for construction vehicles which can obviate the above mentioned disadvantages of the conventional tires.

Another object of the invention is to provide a highly durable pneumatic tire having a layer separation resistance which is superior to that of a conventional standard tire which is not provided with the shredded wire layer under the tread portion, and having a tire cut resistance which is far superior to that of a conventional shredded wire under tread tire which is provided with a layer containing a plurality of short wire length, thereby significantly reducing a rate of occurring the tire cut failures.

In order to attain these objects, the inventors have performed a number of experiments and investigations on carcass ply, breaker and tread rubber layer constituting the above described kind of tire in relation to the above described special purposes and recognized the fact that good results can be obtained by the fundamental solution on the following important problems A to C and the synthetic harmony of these problems.

A. Dispersion and reduction of the strain or stress at the side wall portion of the tire,
B. Restraint against growth of the layer separation in the crown of the tire, and
C. Decrease of the generation of heat in the tire.

In the present invention, in order to improve the cut resistance at the side wall portion of the tire, the carcass is composed of a bias construction of textile cords.

In general, the tire carcass makes use of a radial or semiradial cord arrangement or a bias cord arrangement. In the tires for construction vehicles, the radial or semiradial cord arrangement is exclusively composed of steel cords and the bias cord arrangement is mainly composed of textile cords. The advantages and disadvantages of these radial or semiradial cord arrangement and bias cord arrangement balance with each other. In order to increase the tire cut resistance of the side wall portion of the tire mainly dependent upon the carcass ply, apart from the tire cut resistance of the crown of the tire, it is preferable to use the bias cord arrangement rather than the radial or semiradial cord arrangement. In, in the radial or semiradial cord arrangement, the side wall portion of the tire is rich in its flexibility and hence becomes deformed and subjected to nonuniform pressure under the load condition. The deformed side wall portion is frequently urged against the sharp rocks and stones, while the bias cord arrangement is capable of effectively restraining the side wall portion of the tire against deformation and particularly the use of the organic textile cords ensures a decrease in the difference between their rigidity and the rigidity of rubber and provides the important advantage that the strain or stress at the side wall portion of the tire is effectively dispersed and reduced, and that if the number of carcass plies is increased in accordance with the load, the side wall portion of the tire becomes increased in its rigidity and hence restrains it against protrusion in shape, thereby improving the cut resistance of the side wall portion of the tire.

In the invention, the cords forming the carcass ply are made parallel with each other and are inclined 20° to 45° with respect to the circumferential midline of the crown of tire, but extend in an opposite direction to the cords associated with the other carcass ply layer.

It is preferable that the rubber for coating and fixing the parallel cords of the carcass ply has a Shore hardness of 45 to 85, 300% modulus of 70 to 130 Kg/cm$^2$, and resilience of 35 to 65 Kg/cm$^2$.

The restraint against growth of the layer separation in the crown of the tire will now be described. The steel cord breaker is superimposed over the carcass ply and its rigidity becomes far different from the rigidity of the rubber, and as a result, any minute beginnings of rupture in the rubber near the steel cords or the bond between the steel cords and the rubber are grown and propagated leading to the layer separation in the crown of the tire.

The pneumatic tire for construction vehicles is used under severe heavy-duty conditions. Even if the breaking strength of such tire were made high, the tire might often be subjected to a high load which exceeds the upper limit of the breaking strength of the tire. It is a matter of course that the adhesive force of the steel cords with the rubber and the breaking strength of the rubber near the steel cords should be made high. The invention is based on the recognition that it is preferable to make such adhesive force and the breaking strength on the order which is not considerably detrimental to the manufacture of the tire in a mass-production scale and which is sufficient to prevent the rupture of the rubber near the steel cords or prevent the rupture of the bond between the steel cords and the rubber to a possible extent and to hinder the growth and propagation of such rupture.

In the tire according to the invention, the breaker is composed of at least one rubberized cord layer superimposed over the carcass ply layers and a gap ratio $\delta$ of the cords in the layer is defined by the equation $$\delta = \frac{D-d}{D} = 0.67 \text{ to } 0.83$$

where $D$ is a distance between two adjacent cords and $d$ is a diameter of the cord.

Experimental tests have shown that the gap ratio $\delta$ may preferably be selected to 0.72 to 0.80.

The breaker is superimposed over the outer periphery of the carcass and extends the circumferential midline of the tire over at least the entire width of the tread. It is preferable that the breaker is composed of at least one steel cord layer superimposed over the carcass over a width which is wider than the ground contacting surface of the tread under 100% load condition, but which is smaller than the maximum width between the side wall portions of the tire. The cords of the breaker are inclined a smallest possible angle with respect to the circumferential midline of the tire. It is preferable to make the cords of the breaker parallel with the circumferential midlines of the tire. The cords of the breaker are disposed between the carcass ply and the tread. In a modified tire according to the invention, the cords of the breaker may be disposed between these carcass plies.

The gap ratio of the cords of the breaker is selected as 0.67 to 0.83, preferably as 0.72 to 0.80 as described above. These cords of the breaker are embedded in the coating rubber.

It is preferable that the coating rubber has a Shore A hardness of 50° to 85°, 300% modulus of 100 to 250 Kg/cm$^2$, a tensile strength at room temperature of 150 to 250 Kg/cm$^2$, and a tensile strength at 100°C of 75 to 160 Kg/cm$^2$.

It is preferable that the tread rubber has a Shore A hardness of 55° to 70°, 300% modulus of 70 to 135 Kg/cm$^2$, and resilience of 35 to 65 Kg/cm$^2$. Experimental tests have yielded results indicating that the tread rubber having the above described Shore A hardness, 300% modulus and resilience is excellent in the wear resistance, heat resistance and cut resistance.

As will be described in greater detail, the carcass ply layers may be spaced-apart transversely at the crown thereof on the order of one-third to one-sixth the number of the carcass plies for the purpose of making the overall gauge of the crown thin. In addition, it is preferable to superimpose a textile cord layer over the steel cord layer. Moreover, it is preferable to provide a continuous or discontinuous projections at the buttress portion for the shoulder (Refer in detail to the U.S. Pat. Nos. 3,825,052 and 3,811,488).

As seen from the above, the steel cord breaker has the advantage of improving the cut resistance of the tire for construction vehicles, but has the disadvantage that the use of the steel cord breaker results not only in mechanical separation but also in thermal separation. The inventors have found out that the above described selection of the gap ratio $\delta$ to 0.67 to 0.83 ensures an improvement in the mechanical separation resistance.

The conventional steel cord breaker has adopted the gap ratio $\delta$ on the order of 0.3 to 0.5 which means that considerably large number of cords are embedded in the coating rubber layer. That is, the distance between adjacent cords is at most equal to the diameter of the cord and eventually is not larger than one half of the cord diameter.

Any beginnings of failure of rubber or failure of the bond between the steel cords and the rubber coating near the cords cause a minute local separation. Then, these failure regions become grown and are propagated leading to ultimate layer separation. Experimental load step-up tests on the tires for construction vehicles have yielded the above result.

It is unavoidable that the above described beginnings of minute local separation occur in the tire for construction vehicles under service condition when the rubber is reinforced by the steel cords whose property is considerably different from the property of rubber. The inventors have found out that, in practice, such separation failure could be avoided by restraining the continuous growth of the local separation.

In order to obtain such restraining effect, the invention defines the gap ratio $\delta$ of the steel cords to 0.67 to 0.83 as described above. If the gap ratio $\delta$ is selected to a value larger than the upper limit 0.83, the improvement in the cut resistance could not be obtained even when the steel cord breaker is present.

In practice, the distance between adjacent steel cords of the tire for construction vehicles results in an unavoidable cut beginning at the tread to form cracks therein. It would be foreseen that sharp stones and rocks might be bitten into the cracks. Experimental tests have yielded the result that no such penetration into the tread occurs if the maximum distance between adjacent steel cords is determined to at most five times larger than the diameter of the steel cord ($\delta = 0.83$). On the other hand, the deformation of the tire causes the rubber surrounding the steel cord to be subjected to shearing force.

The narrower the distance between adjacent steel cords is made, the stronger this shearing force is produced. Experimental tests have yielded the result that an excessively strong shearing force is produced if the distance between adjacent steel cords is made narrower than three times the diameter of the steel cord ($\delta = 0.67$).

Experimental tests have shown that if the distance between adjacent steel cords is made too narrow, the above described growth and propagation starting from any minute beginnings of rupture are accelerated, thereby occurring the layer separation.

In accordance with the invention, by taking the above experimental test results into consideration, the lower limit of the distance between adjacent steel cords is determined to three times the diameter of the steel cord ($\delta = 0.67$).

The reasons why the preferably lower limit of the gap ratio $\delta$ is selected to 0.72 are as follows. Any beginnings of local failure occurred near the cords are propagated around the cord and at the same time propagated leading to the local failure around adjacent cords. As a result, if the peripheral length of the cord $\pi d$ is equal to the shortest distance between adjacent cords ($D-d$), the propagation of separation becomes the lowest in speed. In practice, however, the rubber around the cord becomes more fatigued than the rubber in the other regions, and as a result, the local failure occurred at a cord is propagated around the cord at a speed which is 1.25 times faster than the propagation speed leading to the local failure around adjacent cords. This value of 1.25 is more or less changed depending upon the kind of rubber compound and the like. Experimental tests effected on the steel cords embedded in the coating rubber having the above described properties have yielded the above value of 1.25 as an average value of all of the results obtained.

Thus, the above fact is given by $$\pi d/1.25 = D-d$$

$$D = (\pi+1.25)d/1.25$$

$$\delta = \frac{D-d}{D} = \frac{\pi}{\pi + 1.25} = 0.72$$

The experimental tests have yielded the result that the preferable gap ratio $\delta = 0.72$ ensures the separation resistance.

An organic textile cord layer may preferably be inserted between the steel cord layer and adjacent tread rubber layer for the purpose of dispersing the sudden change of the rigidity of that portion of the tire which is located between these two layers in a stopped manner and hence obviating the layer separation therebetween.

In general, the pneumatic tire should have such a basic property that the tire can support the load subjected to the vehicles, and that an internal air pressure of tire balances with this load. The tire constitutes a pressure container which confines the above internal air pressure therein. The strength of the tire as such pressure container is exclusively dependent upon the construction of the carcass.

In the tire for construction vehicles, however, the load per one tire is considerably heavier than that subjected to the passenger car tire or truck and bus tire, and as a result, the carcass of the tire for construction vehicles, which must support the above described pressure container should necessarily be high in strength.

The tire according to the invention makes use of a carcass ply composed of textile cords, so that the number of carcass plies must be increased. As a result, the rigidity of the side wall portion of the tire is increased. In addition, the tire according to the invention makes use of bias construction which also increases the rigidity of the side wall portion of the tire. Such increase of rigidity of the side wall portion of the tire makes the deformation of the tire difficult when subjected to load, thereby reducing the side cut. When the tire is used under such condition that the side cut is liable to be frequently occurred, the outside and inside of the side wall portion of the tire may be reinforced or provision may be made of means for preventing the side cut.

The required number of carcass plies is determined as follows. A tire size is, for example, 18.00–25. The maximum load supported by the tire is 8,530 Kg and the internal air pressure of tire is 5.6 Kg/cm². The strength of carcass for supporting such internal air pressure must be 72.8 Kg by taking the customary safety factor into consideration. If use is made of 1,260 $d/2$ textile such as nylon which is a typical example of the textile cord with a bias cord angle of 50° with respect to the crown center and 25 nylon cords/2.5 cm embedded in the coating rubber and based on the strength of 19 Kg per one nylon cord, approximately 22 carcass plies must be used.

If use is made of steel cord whose strength per one cord is 300 Kg in the radial construction carcass ply, one carcass ply is sufficient.

As seen from the above, the rigidity of the textile cord carcass ply becomes considerably different from that of the steel cord carcass ply. The textile cord carcass is protruded sidewardly by 25 mm under 100% load, while the steel cord carcass is protruded sidewardly by 65 mm under the same 100% load. The tire provided with the textile cord carcass according to the invention, therefore, is capable of decreasing deformation and hence of reducing the side cut.

In addition, the breaker composed of a textile cord layer superimposed over a steel cord layer serves to disperse the sudden change of the rigidity of that portion of the tire which is located between the steel cord layer and the tread rubber layer in a stepped manner and hence to avoid the layer separation between the steel cord layer and the tread rubber layer.

The decrease of the generation of heat in the tire will now be described. The use of measures of preventing the generation of heat of the tire has heretofore been considered to be contradictory to the cut resistance of the tire.

Among the properties required for the tire for construction vehicles, the heat resistance and the cut resistance are the most important. In general, the cut resistance can be improved by making the tread gauge thick, but if the tread gauge becomes too thick, the heat resistance becomes poor.

In relatively small size tires whose tire size is 12.00 to 16.00 and whose tire section height measured from the bead to the tread in a section on a plane inclusive of and perpendicular to the rotating axis of the tire is on the order of 400 to 450 mm, the heat resistance and the cut resistance required for such small size tires are relatively moderate, and as a result, these requirements can easily be satisfied.

In relatively large size tires whose size is over 18.00–25 and whose tire section height measured from the bead to the tread is on the order of at least 500 mm, the load subjected to one tire becomes heavy and the service condition becomes severe. In addition, the tread rubber layer is designed such that its gauge is relatively thick. In such relatively large size tires, if the gauge of the tread rubber layer is made large for the purpose of improving the cut resistance, the heat generated becomes accumulated and it is inevitable to occur the tire failure.

In accordance with the invention, the term relatively large tire for construction vehicles shall be understood to designate tires whose size is at least 18.00.

In accordance with the invention, the thickness of the tread rubber layer is made thin contrary to the conventional technique of increasing the thickness of the tread rubber layer for the purpose of improving the cut resistance of the tire.

The invention will now be described in greater detail with reference to the accompanying drawings, wherein.

Figure 1:
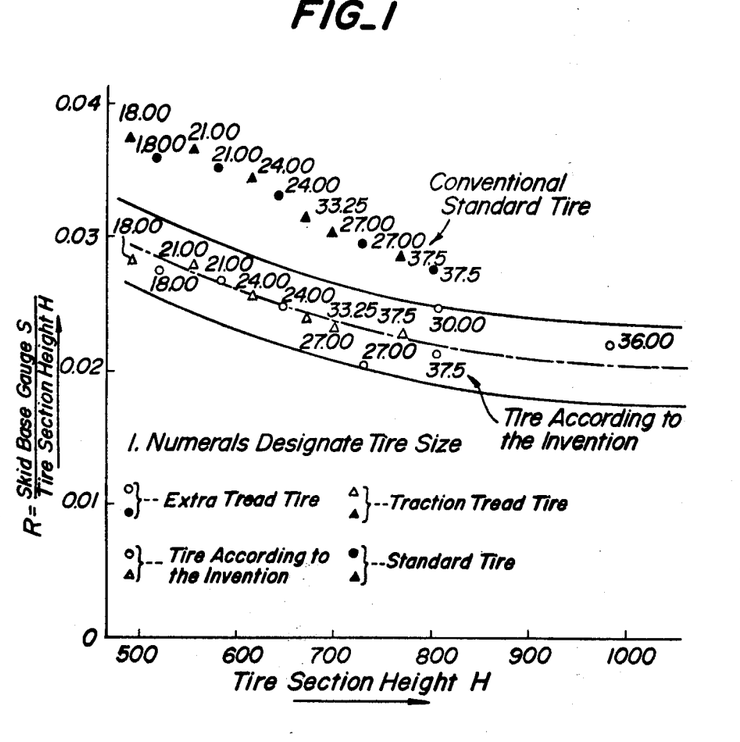
FIG. 1 is a graph which illustrates a preferred range of a skid base of the tire according to the invention.

As seen from FIG. 1, the tire according to the invention makes the gauge of the tread rubber layer thinner than that of the conventional standard tire so as to exceed the generation of heat in the tire. As a result, the separation resistance in the steel cord layer of the breaker can be improved and the steel cord layer can improve the cut resistance in the crown of the tire.

In accordance with the invention, in order to improve the thermal separation resistance, a ratio R of a skid base gauge S to a tire section height H is defined by a range given by $$R = \frac{9}{H} + (1.1 \times 10^{-2} \pm 3.0 \times 10^{-3})$$

The upper limit given by the above equation is determined by the allowable amount of heat accumulated in the tread rubber layer, while the lower limit given by the above equation is determined by the allowable wear resistance and cut resistance of the tread rubber layer.

As seen from the above, the tread rubber layer gauge of the tire according to the invention is replaced by the skid base gauge S. Because, there are various types of tires having the same size such as traction type, trailing type, extra tread type and the like. These types of tires have tread grooves whose depths are different from each other as shown in the following Table 1.

Table 1

| Tire size | | Depth of tread groove (mm) | | |
|---|---|---|---|---|
| Regular | Wide base | Traction type | Trailing type | Extra tread type |
| 18.00 | 23.5 | 31.5 | 17.8 | 53.8 |
| 21.00 | 26.5 | 34.8 | 19.6 | 53.8 |
| 24.00 | 29.5 | 38.1 | 21.3 | 57.2 |
| — | 33.25 | 42.4 | — | — |
| 27.00 | 33.5 | 42.4 | 23.4 | 63.5 |
| — | 37.25 | 46.5 | — | — |
| 30.00 | 37.5 | 46.5 | 25.7 | 69.6 |
| 33.00 | 41.5 | 50.3 | — | 75.7 |
| 36.00 | 45.5 | 54.6 | — | 81.8 |

These depths of tread groove are determined to a certain extent by standard depths and could not be changed with ease. As a result, the depth of tread groove is made out of consideration and the skid base gauge S only is used for the purpose of determining the thickness of the tread rubber layer.

As stated hereinbefore, the use of the carcass having the bias construction and composed of textile cords such as nylon cords prevents the side wall portion from being cut by the sharp stones and rocks. In addition, the gap ratio $$\delta = \frac{D-d}{D}$$

determined on the order of 0.67 to 0.83, preferably 0.72 to 0.80 renders it possible to make the density of steel cords in the steel cord layer relatively small. The use of the measures described prevents any beginnings of cut in the tread from being grown and penetrated through the tread and effectively prevents any beginnings of rupture in the rubber near the steel cords or the bond between the steel cords and the rubber from being grown and propagated leading to the separation in the crown of the tire. This restrainable effect can be obtained without increasing the strength of the bond between the steel cords and the coating rubber and without increasing the strength of rubber near the steel cords to such an extent that expenses required for the commercial production of tire become excessively high. Moreover, the breaker composed of a steel cord layer and a textile cord layer superimposed over the steel cord layer serves to increase the above described restrainable effect. Thus, the tire according to the invention has not only excellent cut resistance but also excellent separation resistance. This cut resistance can be obtained without making the skid base gauge S thick and hence without accumulating the heat generated in the tread which has been encountered with the conventional technique of making the skid base gauge thick for the purpose of improving the cut resistance. In short, the above described breaker construction and the ratio R of the skid base gauge S to the tire section height H permit the propagation leading to the separation to stop, the cut resistance of the tread rubber layer to improve and the excellent separation resistance and wear resistance to obtain.

That portion of the carcass ply in the crown of the tire which is located directly below the steel cord layer of the breaker may partly be spaced-apart transversely so as to make the gauge of the crown as a whole thin, thereby reducing the amount of heat generated and accumulated in the tread and adapting the tire to the severe service conditions.

In this case, the number of carcass plies and width thereof to be spaced-apart transversely should be limited to such an extent that the strength of carcass as a whole is not substantially decreased. Experimental tests have demonstrated that it is preferable that the number of carcass plies to be spaced-apart transversely of the tread is on the order of one-sixth to one-third the number of the carcass plies and that the width of carcass plies to be spaced-apart on the order of 85 to 90% of the width of the breaker of the steel cord and hence 5 to 15% of the breaker width are overlapped with and supported by the side edges of the carcass plies whose crown portions are spaced-apart.

In this case, it is preferable that the opposed ends of the carcass plies whose center portions are spaced-apart are superimposed one upon the other in a stepped manner so as to avoid a sudden change of their rigidity.

The use of such carcass plies whose center portions are spaced-apart is capable of lowering the temperature of heat produced in the tread by about 5° to 10°C and of increasing the durability of the tire by about 10% of the durability of the tire having the customary carcass ply.

The steel cord layer of the breaker may be composed of a plurality of annular bodies divided from each other in the transverse direction. If the steel cord breaker is composed of at least two layers, it is preferable to arrange the annular bodies in each layer in an overlapped relation with the annular bodies in another layer. Such overlapped arrangement of the annular bodies in the cord layers renders it possible to uniformly distribute the stress subjected to the breaker.

The textile cord of the carcass ply and the textile cord constituting a part of the breaker may be made of nylon, vinylon, polyester and the like. The steel cord constituting another part of the breaker may be composed of cords which are subjected to a treatment of improving their adherence with rubber, for example, a brass plated steel cord and the like.

An embodiment of the pneumatic tire for construction vehicles according to the invention will now be described.

Figure 2:
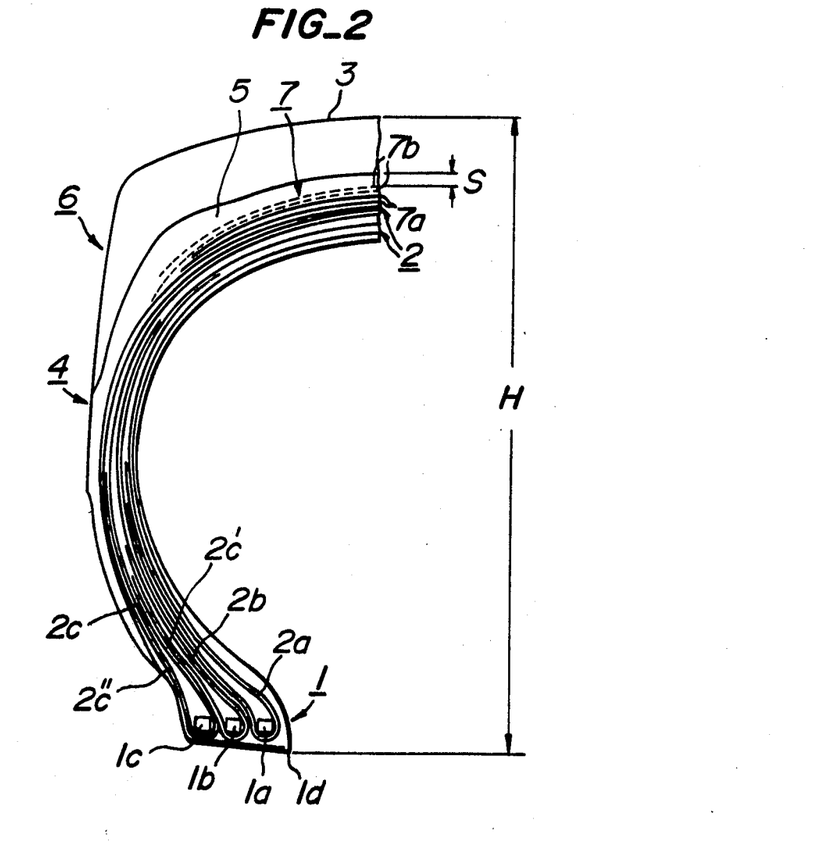
FIG. 2 is a longitudinal section of one embodiment of the tire according to the invention taken on a plane inclusive of and perpendicular to the rotating axis of the tire.

In FIG. 2 is shown a vertical center sectional view of a left half of a pneumatic tire according to the invention taken on a plane inclusive of and perpendicular to the rotational axis of the tire. The pneumatic tire shown in FIG. 2 has a size of 18.00–25, and whose number of carcass plies is 32 i.e. 32 PR (32 PR designates the number of plies on the basis of cotton thread). In the present embodiment, a bead 1 is composed of an inner bead bundle $1a$, middle bead bundle $1b$ and outer bead bundle $1c$. In addition, a carcass ply 2 is composed of 22 plies each made of nylon cord of 1,260 denier/2 strands. The eight inner plies $2a$ are turned around the inner bead bundle $1a$ from the inside to the outside thereof. Similarly, the six middle plies $2b$ are turned around the middle bead bundle $1b$ from the inside to the outside thereof. In addition, those four outer plies $2c'$ which are located inside the eight outer plies $2c$ are turned around the outer bead bundle $1c$ from the outside to the inside thereof and are secured thereto, while those four outer plies $2c''$ which are located outside the eight outer plies $2c$ extend from the outside of the middle and inner bead bundles $1b$, $1c$ through the lower side to the outside thereof and terminate at a toe portion $1d$ of the bead 1 and are secured thereto.

In the present embodiment, four carcass plies of the 22 plies are spaced-apart transversely to make them absent at a crown 5 of the tire as shown in FIG. 2.

That is, the other 18 carcass plies are extended continuously from the bead 1 across the crown 5 of the tire to a like bead (not shown) of a right half of the tire spaced from and parallel to the bead 1, while the above described four carcass plies are extended noncontinuously.

In other words, the above described four carcass plies are fixed to the bead bundles at the bead 1 in the manner similar to the other 18 carcass plies and extend from the bead 1 circumferentially through the inside of a side wall portion 4 to a tread portion 3 and terminate at near a shoulder portion 6 of the tire where the side wall portion 4 coincides with the crown 5 of the tire.

The 22 carcass plies are so arranged that the cords run on a bias from one bead of the tire to the other, making an angle of approximately 35° with a circumferential center line passing along the crown 5 of the tire. A steel cord layer $7a$ is arranged in the crown 5, superimposed over the carcass plies 2 and extends in circumferential fashion over the total region of the tread 3.

This steel cord layer $7a$ is formed by two rubberized textile fabrics consisting of twisted cords each composed of $1\times3+5\times7+1\times0.15$ (filament diameter 0.15 mm; code diameter 1.45 mm). The steel cord layer $7a$ has an end count of about eight ends per 5 cm for the layer and is so arranged that the cords run on a bias from one bead of the tire to the other, making an angle of approximately 35° with a circumferential center line passing along the crown of the tire. It has been the common practice to dispose these steel cords in the breaker on the order of 24 to 27 ends per 5 cm for the layer. Thus, the number of the steel cords disposed in the steel cord layer according to the invention is very few.

A textile cord layer $7b$ is superimposed over the steel cord layer $7a$. This textile cord layer $7b$ is formed by two rubberized textile cord fabrics. In each fabric are disposed 840 denier/2 strands cords in a manner such that each cord layer is formed by approximately 15 ends per 5 cm for the fabric layer and is so arranged that the cords run on a bias from one bead of the tire to the other, making an angle of approximately 35° with a circumferential center line passing along the crown of the tire. The textile cord layer $7b$ has a width which can fully cover the steel cord layer $7a$. In the embodiment shown in FIG. 2, the textile cord layer $7b$ is protruded from each side edge of the steel cord layer $7a$ by approximately 20 mm so that the width of the textile cord layer $7b$ becomes slightly larger than the width of the tread 5.

Thus, a breaker 7 is formed by the steel cord layer 7a and the textile cord layer 7b.

The gauge of the tread rubber layer 3 at the circumferential midline of the tire is 67.4 mm and the depth of the tread groove is 53.9 mm so that the thickness of the skid base S becomes 13.5 mm. As a result, a ratio R of S to the tire section height H is given by $$R = \frac{S}{H} = 0.260.$$

Figure 3:
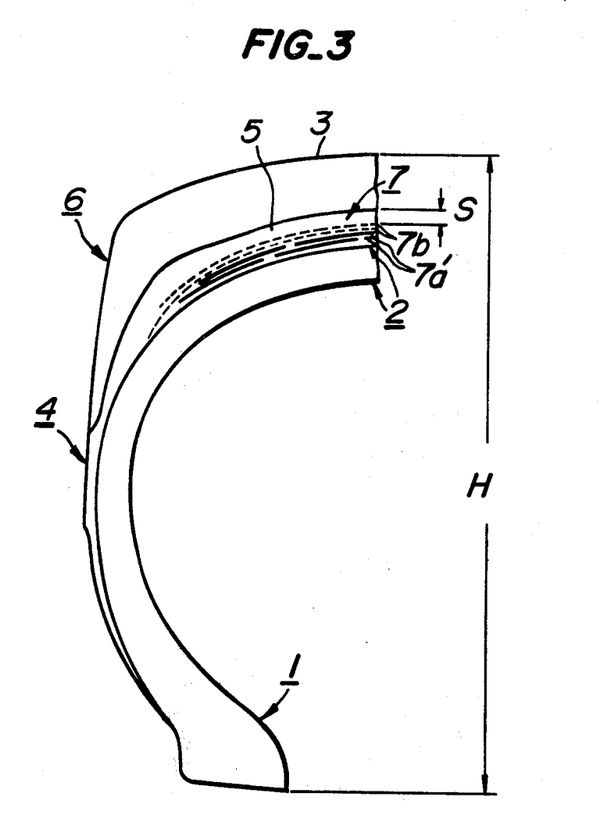
FIG. 3 shows similarly to FIG. 2 a longitudinal section of another embodiment of the tire according to the invention.

In FIG. 3 there is shown a vertical center sectional view of a left half of another embodiment of the pneumatic tire according to the invention taken on a plane inclusive of and perpendicular to the rotational axis of the tire. In the present embodiment, a steel cord layer 7a' is divided into a plurality of separate annular bodies in the peripheral widthwise direction of the tire, the carcass 2, breaker 7 and tread 3 being the same in construction as those shown in FIG. 2. That is, the steel cord layer 7a' is formed by two rubberized textile fabrics and a plurality of twisted cords composed of 1×3+5×7+1×0.15 are disposed in each of the layer in a manner such that the layer 7a' has an end count of approximately eight ends per 5 cm of the layer and extend on a bias from one bead of the tire to the other, making an angle of approximately 35° with a circumferential center line passing along the crown of the tire.

In both embodiments shown in FIGS. 2 and 3, the width measured along the steel cord layer adjacent to the carcass 2 is 420 mm, while the width of the steel cord layer adjacent to the textile cord layer 7b is 360 mm. In the embodiment shown in FIG. 2, use is made of two steel cord layers 7a whose cords are uniformly spaced-apart by about 6 mm. The number of cords in the steel cord layer adjacent to the textile cord layer 7b is 58, while the number of cords in the steel cord layer adjacent to the carcass 2 is 68. In the embodiment shown in FIG. 3, the width 420 mm of the steel cord layer 7a' adjacent to the carcass 2 is divided into four separate annular bodies each having 90 mm width and these four separate annular bodies are spaced apart from each other by 20 mm and bonded at these spaces to the coating rubber layer. In each annular body having 90 mm width the steel cords are arranged with an end count of 14 ends per 6 mm (18 steel cords/5 cm). The width 360 mm of the steel cord layer 7a' adjacent to the textile cord layer 7b is divided into three separate annular bodies whose widths are 115 mm, 90 mm and 115 mm, respectively, and these three annular bodies are spaced apart from each other by 20 mm and bonded at these spaces to the coating rubber layer. In each annular body having 115 mm or 90 mm width, the steel cords are arranged with an end count of 14 ends per 6 mm (18 steel cords/5 cm).

In the embodiment shown in FIG. 3, the separate annular bodies are alternately superimposed at their side edges one upon the other. This construction is capable of effectively preventing a cut in the crown, a concentration of stress or strain which has been encountered with the conventional steel cord layer and a separation due to such concentration and leading to ultimate failure of the tire.

In the embodiment shown in FIG. 2, the stress subjected to the steel cord layer 7a is distributed such that the stress becomes maximum at both sides of the steel cord layer 7a, while in the embodiment shown in FIG. 3 wherein the steel cord layer 7a' is divided into a plurality of separate annular bodies, the stress subjected to these separate annular bodies is distributed such that the stress becomes maximum at both sides of each of the annular bodies, the maximum stress being smaller, and as a result, the stress is distributed and balanced in the widthwise direction of the tire.

The tire according to the invention will now be compared with the conventional tires.

Figure 4A:
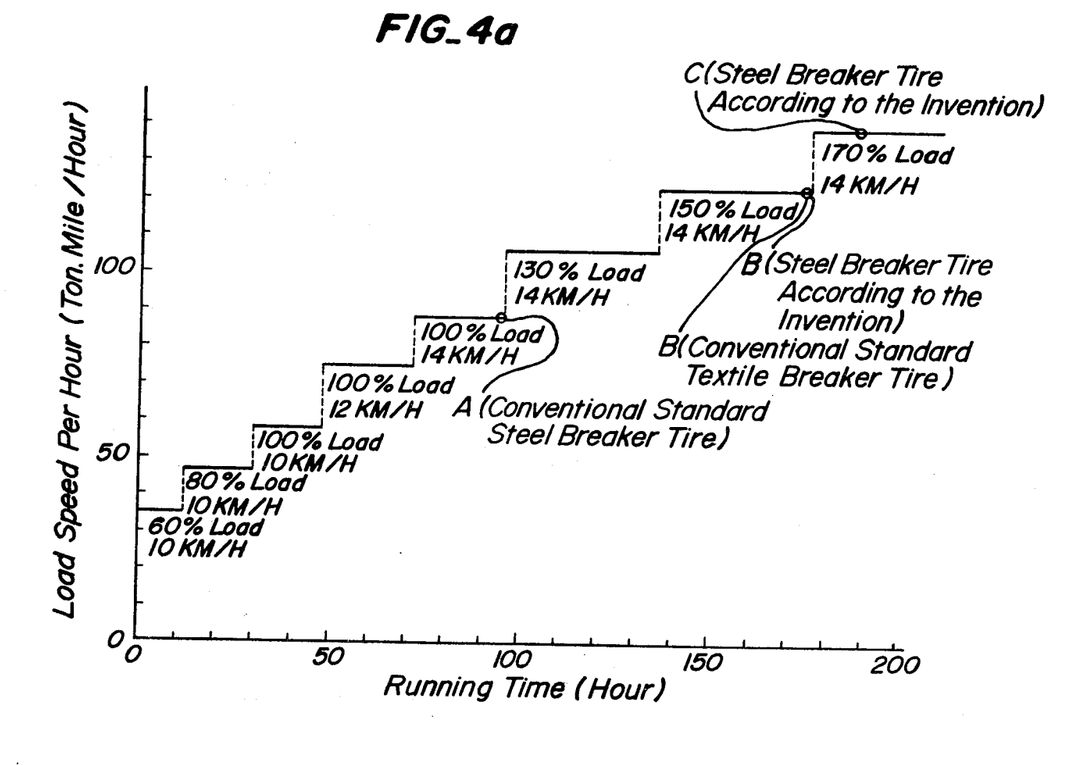
FIG. 4a is a graph which illustrates the result of the load speed step-up test effected on conventional standard tires whose tread thickness is large and tire according to the invention.

In FIG. 4a is shown load speed step-up test results effected by an indoor drum testing machine. In FIG. 4a the abscissa shows the running time in hour and the ordinate shows the load speed per hour in ton·mile/-hour. The internal pressure of all of the tires being tested is 5.6 Kg/cm² and the load speed is stepped up from 60% load·10 Km/H to 170% load·14 Km/H. The 100% load corresponds to 8,530 Kg (normal load for 18.00-25 tire defined by JIS).

In FIG. 4a, a point A shows the load speed and running time lasted before the separation failure of a conventional standard steel breaker tire, a point B shows the load speed and running time achieved before the separation failure of one embodiment of the tire according to the invention and a conventional standard textile breaker tire, and a point C shows the load speed and running time achieved before the separation failure of another embodiment of the tire according to the invention. That is, the customary steel breaker of the conventional standard tire having the gap ratio δ on the order of 0.3 to 0.5 became overheated above its allowable temperature and was separated at the point A under the load speed 100%, 14 KM/H. On the contrary, the tire according to the invention safely travelled over the load step A and became overheated above its allowable temperature and was separated at the point B under the step-up load speed 150%, 14 KM/H and eventually at the point C under the step-up load speed 170%, 14 KM/H.

Experimentation has shown that the separation of the steel cord layer of the tire according to the invention occurs in the following steps. In the first place, the rubber located near the steel cord layer becomes ruptured. Secondly, the rubber sandwiched between adjacent steel cord layers becomes ruptured after the tire has travelled for a considerable distance. Finally, the separation of the breaker occurs.

In the conventional standard tire having the customary steel cord breaker, when separation leading to the ultimate failure occurs, the rubber located near the steel cords becomes ruptured which is quickly propagated leading to ultimate entire separation of the breaker as a whole. On the contrary, in the case of the tire according to the invention, the increase of the amount of rubber between the cords of the steel cord layer or the decrease of the number of cords in the steel cord layer ensures a sufficient time exists before the individual rupture of the rubber at the adjacent cords becomes a continuous rupture and provides the important advantage that propagation leading to ultimate entire separation of the breaker as a whole can reliably be restrained.

Figure 4B:
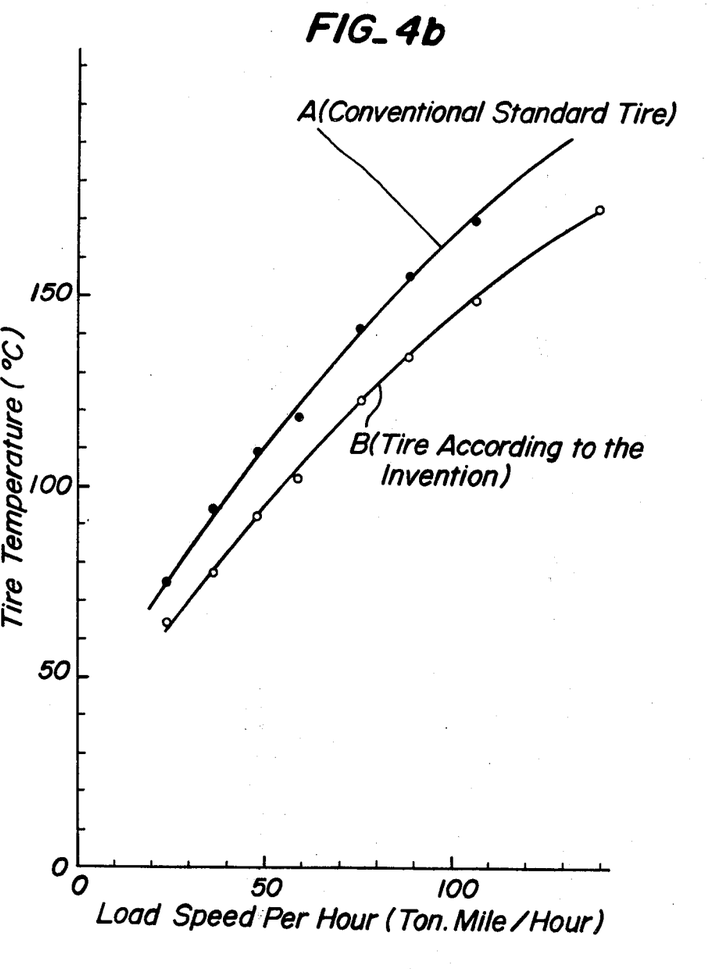
FIG. 4b is a graph which illustrates the relation between the tire temperature and the load speed obtained when the conventional standard tire and the tire according to the invention are heated.

In FIG. 4b are shown relations between the tire temperature and the load speed. As seen from the curves A and B in FIG. 4b, the separation resistance of the tire according to the invention is superior to the conventional standard tire for approximately 20°C.

Figure 5A:
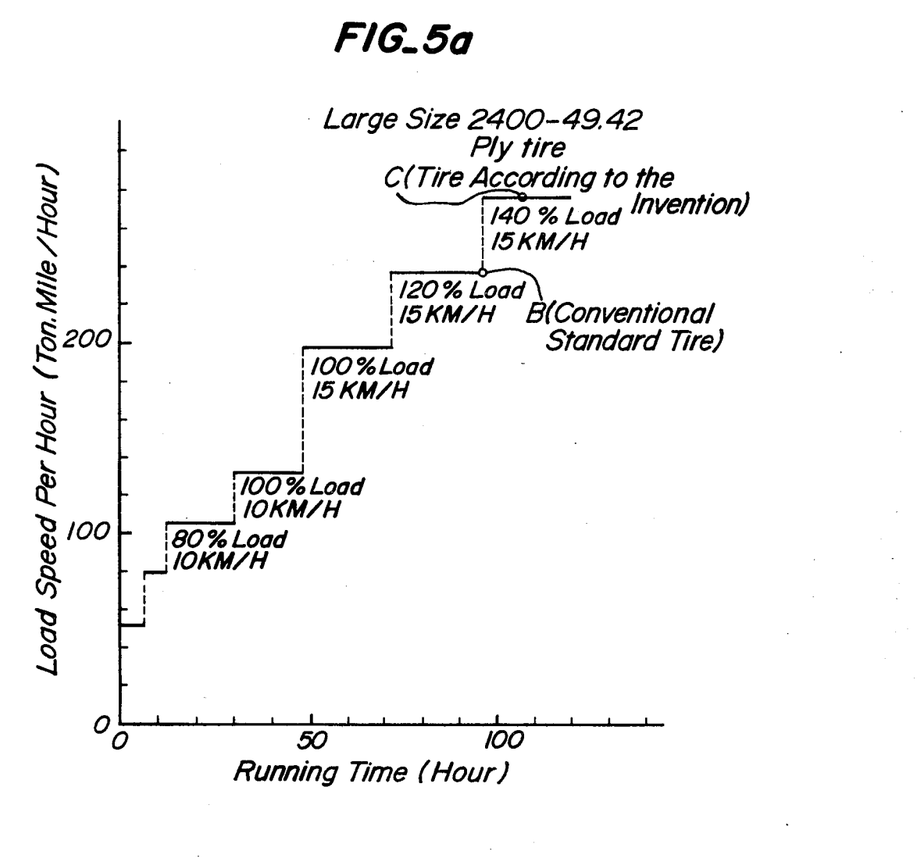
FIG. 5a is a graph which illustrates the result of the load speed step-up test effected on the conventional standard tire and tire according to the invention, both being a larger size 24.00–49.

In FIG. 5a is shown a graph showing the relation between the load speed per hour and the running time in hour. This relation is obtained when the load speed subjected to a large size 24.00–49, 42 ply tire is stepped up as in the test described with reference to FIG. 4a.

Figure 5B:
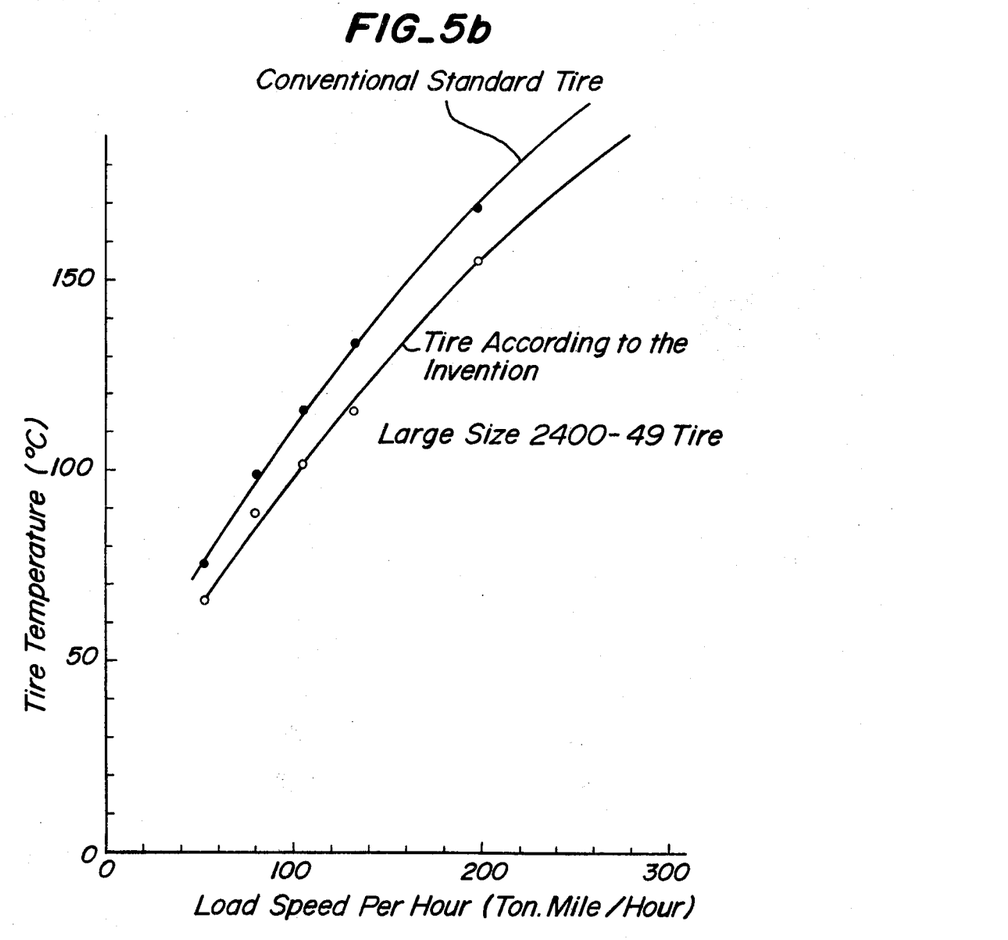
FIG. 5b is a graph which illustrates the relation between the tire temperature and the load speed obtained when the conventional standard tire and tire according to the invention are heated.

In FIG. 5b are shown relations between the tire temperature and the load speed of this large size 24.00–49, 42 ply tire.

As seen from FIGS. 5a and 5b, the separation resistance at the point C of the large size tire according to the invention is superior to that at the point B of the conventional large size standard tire.

Figures 6A, 6B:
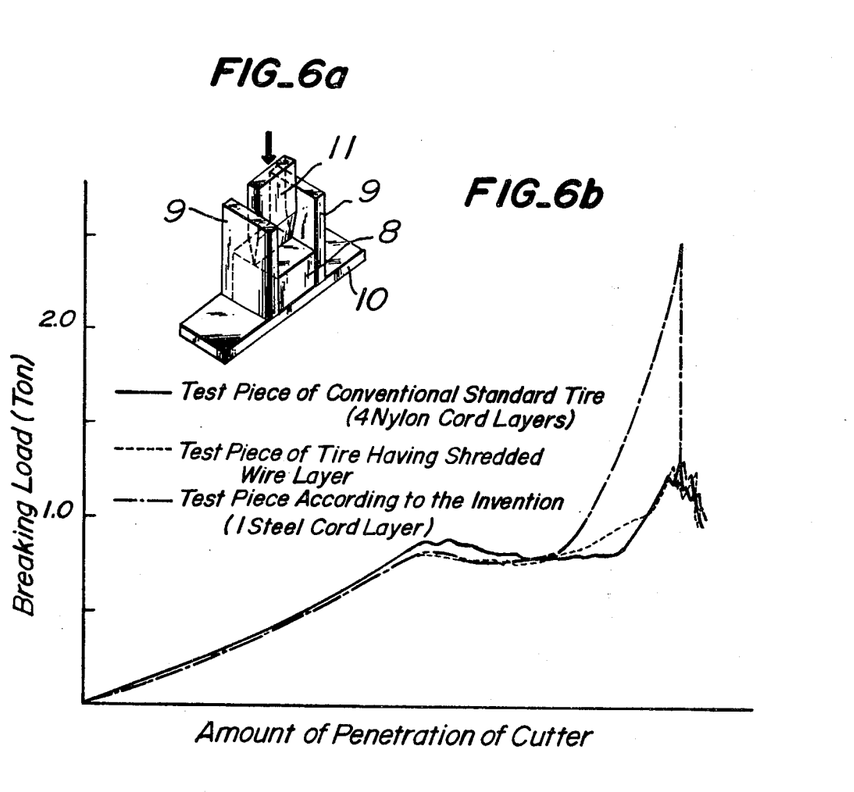
FIG. 6a is a perspective view showing a cutter and jig for a cutting test.
FIG. 6b is a graph which illustrates the relation between the breaking load and the amount of penetration of cutter obtained when the cutting test shown in FIG. 6a is effected on test pieces of the conventional standard tire and tire having shredded wire layer and on a test piece of the tire according to the invention.

In FIG. 6a is shown a test piece 8 sandwiched between two legs 9 of a jig 10 and subjected to cutting force of a cutter 11. The test piece 8 is 80 mm (width) × 150 mm (length) × 50 mm (thickness) cut from the crown of tires to be tested.

The test pieces are provided in common with a carcass having a thickness of 5 mm and composed of four plies each consisting of 1,260 denier/2 strands. The conventional standard tire is provided with a tread rubber layer of 40 mm in thickness and a four rubberized nylon breaker having a total thickness of 5 mm. The conventional tire having a shredded wire layer is provided with a tread rubber layer of 40 mm in thickness and a shredded wire layer of 5 mm in thickness (0.15 mm$\phi$ × 12 mm length; mixed weight ratio 10%). The test piece according to the invention is provided with a tread rubber layer of 40 mm in thickness and a breaker of 5 mm in thickness and is composed of steel cords of strands of 1×3+5×7+1×0.15, the steel cords being spaced apart from each other by 6 mm.

Each of these test pieces was sandwiched between the two legs 9 of the jig 10. Use was made of a cutter 11 of 80 mm width × 10 mm thickness made of SK3 and having a tapered knife edge inclined at an angle of approximately 15° with respect to the lengthwise direction of the cutter 11. The cutter was penetrated into each of the test pieces with a speed of 300 mm/min and the amount of penetration of the cutter into the test piece was measured.

In FIG. 6b are shown the relations between the breaking load and the amount of penetration of the cutter 11 into each of the test pieces 8. As seen from FIG. 6b, the cut resistance of the test piece according to the invention is increased at least 200% if compared with those of the conventional standard tire and the conventional tire having a shredded wire layer.

As stated hereinbefore, the invention is capable of significantly improving the cut resistance of a tire for construction vehicles which are used under heavy load conditions without deteriorating the separation resistance of the tire.

What is claimed is:

1. A pneumatic tire for construction vehicles comprising:
    a plurality of carcass ply layers having a bias construction of textile cords, said textile cords being turned around a bead bundle located at one of a pair of beads,
    a breaker having at least one rubberized steel cord layer superimposed over said plurality of carcass ply layers and extending symmetrically with respect to the peripheral center line of the tire, and
    a tread rubber layer superimposed over said breaker, said breaker rubberized steel cords having a gap ratio $\delta$ defined by the equation:

$$\delta = \frac{D-d}{D} = 0.67 \text{ to } 0.83$$

where D is a distance between centers of two adjacent cords and d is a diameter of the cord.

2. A pneumatic tire for construction vehicles as claimed in claim 1, wherein said breaker which is composed of at least one steel cord layer and extending symmetrically with respect to the peripheral center line of the tire, is disposed over a width which is at least equal to the width of said tread, and said gap ratio $\delta$ is in the range of 0.72 to 0.83.

3. A pneumatic tire for construction vehicles as claimed in claim 1, wherein said gap ratio $\delta$ is in the range of 0.67 to 0.83 and said tread rubber layer is defined by a ratio R of a skid base S to a tire section height H defined by the equation:

$$R = \frac{S}{H} - \frac{9}{H(\text{mm})} + (1.1 \times 10^{-2} \pm 3.0 \times 10^{-3}).$$

4. A pneumatic tire for construction vehicles as claimed in claim 3, wherein said gap ratio $\delta$ is in the range of 0.67 to 0.80.

5. A pneumatic tire for construction vehicles as claimed in claim 3, wherein said gap ratio $\delta$ is in the range of 0.67 to 0.80 and said breaker is composed of at least one steel cord layer extending symmetrically with respect to the peripheral center line of the tire and at least one textile cord layer superimposed over said steel cord layer and extending over a width which is wider than the width of said steel cord layer.

6. A pneumatic tire for construction vehicles as claimed in claim 1, wherein said gap ratio $\delta$ is in the range of 0.67 to 0.80 and said breaker being embedded in a rubber layer having Shore A hardness of 50 to 85°, 300% modulus of 100 to 250 Kg/cm$^2$ and tensile strength at 100°C of 75 to 160 Kg/cm$^2$.

7. A pneumatic tire for construction vehicles as claimed in claim 5, wherein said steel cord layers are divided into a plurality of separate annular bodies in the peripheral widthwise direction of the tire, the annular bodies which are adjacent to said textile cord layer are alternately superimposed at their side edges over those annular bodies which are adjacent to said carcass ply layers.

8. A pneumatic tire for construction vehicles as claimed in claim 1, wherein said gap ratio $\delta$ is in the range of 0.67 to 0.80 and that portion of the carcass ply in the crown of the tire which is located directly below the steel cord layer of the breaker is partly spaced-apart transversely and the number of said carcass ply layers thus spaced-apart is on the order of one-sixth to one-third the number of the carcass plies which extend in circumferential fashion from one of said pair of beads to another bead.

9. A pneumatic tire for construction vehicles as claimed in claim 8, wherein additionally, 5 to 15% of the breaker width are overlapped with and supported by the side edges of the carcass plies whose crown portion is spaced-apart transversely.

10. A pneumatic tire for construction vehicles as claimed in claim 5, wherein said tire is of a size greater than 18.00–25.

* * * * *